UNITED STATES PATENT OFFICE.

FELIX THIELE, OF NEW YORK, N. Y., ASSIGNOR OF ONE-HALF TO WILLIAM C. CONRAD, OF SAME PLACE.

PROCESS OF MAKING ZIRCONIUM NITRATE.

SPECIFICATION forming part of Letters Patent No. 410,865, dated September 10, 1889.

Application filed July 19, 1889. Serial No. 318,046. (No specimens.)

*To all whom it may concern:*

Be it known that I, FELIX THIELE, a citizen of the German Empire, and a resident of the city, county, and State of New York, have invented certain new and useful Improvements in the Process of Making Water-Soluble Nitrate of Zirconium, of which the following is a specification.

This invention relates to an improved process of making nitrate of zirconium soluble in water for the purpose of employing the same as an incandescent body in connection with electric carbons or with incandescent gas-burners for the purpose of increasing the illuminating-power of the electric or gas light; and the invention consists of a process of making nitrate of zirconium by first treating the ores containing zirconium with sulphuric acid, so as to form sulphate of zirconium, and then mixing it with nitrate of barium, so as to form pure nitrate of zirconium.

In carrying out my invention ground ores of zirconium are first treated with hydrochloric acid, the residue being then heated with sulphuric acid for several hours. The residue is then evaporated, diluted with water, and filtered. To the solution containing sulphate of zirconium is added a concentrated solution of nitrate of barium, the mixture being allowed to stand for six hours at ordinary temperature. By the reaction taking place in the solution sulphate of barium is precipitated, which is then separated by filtration, while the solution contains pure nitrate of zirconium, which is obtained by evaporation. As the same is soluble in water, it can be mixed with the plastic mass from which the carbons for electric-arc lamps are made, to which it imparts an increased durability, a greater illuminating-power, and a whiter flame.

The same advantages result when used with incandescent gas-burners, by which a stronger and brighter light is obtained.

Having thus described my invention, I claim as new and desire to secure by Letters Patent—

The process herein described of making water-soluble nitrate of zirconium, which consists, first, in subjecting the zirconium ores to the action of hydrochloric acid, then heating it with sulphuric acid, so as to form sulphate of zirconium, and, finally, mixing it with a solution of nitrate of barium, so as to form by reaction therewith pure nitrate of zirconium, substantially as set forth.

In testimony that I claim the foregoing as my invention I have signed my name in presence of two subscribing witnesses.

FELIX THIELE.

Witnesses:
T. H. REIMHERR,
JOHN A. STRALEY.